United States Patent
Alberi-Morel et al.

(10) Patent No.: US 8,326,284 B2
(45) Date of Patent: Dec. 4, 2012

(54) METHOD OF TRIGGERING A HANDOVER OF A MOBILE STATION IN A DISCONTINUOUS COVERAGE NETWORK

(75) Inventors: Marie Line Alberi-Morel, Cachan (FR); Veronique Capdevielle, Magny les Hameaux (FR)

(73) Assignee: Alcatel Lucent, Paris (FR)

( * ) Notice: Subject to any disclaimer, the term of this patent is extended or adjusted under 35 U.S.C. 154(b) by 1203 days.

(21) Appl. No.: 11/859,977

(22) Filed: Sep. 24, 2007

(65) Prior Publication Data

US 2008/0085711 A1   Apr. 10, 2008

(30) Foreign Application Priority Data

Oct. 9, 2006  (EP) .................................. 06291586

(51) Int. Cl.
*H04W 36/00* (2009.01)
*H04W 4/00* (2009.01)

(52) U.S. Cl. .................... 455/432.1; 455/436
(58) Field of Classification Search .............. 455/432.1, 455/436, 435.2, 439; 370/331, 395.5, 355, 370/358, 396
See application file for complete search history.

(56) References Cited

U.S. PATENT DOCUMENTS

| 7,656,841 B2 * | 2/2010 | Brouet et al. ................ 370/331 |
| 2005/0053034 A1 | 3/2005 | Chiueh |
| 2006/0030329 A1 | 2/2006 | Faye et al. |

FOREIGN PATENT DOCUMENTS

| CN | 1283064 (A) | 2/2001 |
| CN | 1735226 (A) | 2/2006 |
| DE | 10025725 A1 | 12/2001 |
| EP | 1624711 A1 | 2/2006 |
| EP | 1777890 A1 * | 4/2007 |
| KR | 20030056308 (A) | 7/2003 |

OTHER PUBLICATIONS

Alcatel: "4G Mobile" Internet Citation, [Online] May 31, 2005, XP002383333.

* cited by examiner

*Primary Examiner* — Melody Mehrpour
*Assistant Examiner* — Emem Stephen
(74) *Attorney, Agent, or Firm* — Fay Sharpe, LLP

(57) ABSTRACT

There is provided a method of triggering a handover of a mobile station in a discontinuous coverage radio network, wherein the method comprises the steps: transferring at a point in time a data volume via a first transfer zone of the discontinuous coverage radio network to a cache storage of the mobile station, wherein the data volume permits the provision of a service to the mobile station for at least the duration of a period of time, wherein the first transfer zone is the serving transfer zone of the mobile station; triggering the handover of the mobile station from the first transfer zone to a second transfer zone of the discontinuous coverage radio network only after the period of time has been spent with respect to the point in time, wherein the mobile station has been moved in the mean time from the first transfer zone to the second transfer zone.

9 Claims, 3 Drawing Sheets

METHOD OF TRIGGERING A HANDOVER OF A MOBILE STATION IN A DISCONTINUOUS COVERAGE NETWORK

The invention is based on a priority application EP 06 291 586.3 which is hereby incorporated by reference.

TECHNICAL FIELD

The invention relates to a method of triggering a handover of a mobile station in a discontinuous coverage network in general. In other aspects the invention relates to a discontinuous coverage network, to a network component of the discontinuous coverage network, and to a computer program product that is adapted to perform the method in accordance with the invention.

BACKGROUND OF THE INVENTION

Discontinuous coverage networks are also denoted as discontinuous coverage access networks. According to the working principle of discontinuous coverage networks, transmission of data from a specific network equipment via a radio access point to users as, e.g., mobile stations or terminals, generally occurs only in high rate data transfer areas which benefit from good conditions for radio-based data transfer. The specific network equipment is also referred to in the following as network component and such high rate data transfer areas are hereinafter referred to as 'transfer zones'. A given transfer zone is generally made up of a number of highest radio data areas (corresponding to the highest physical transmission modes) surrounding a given radio access point.

In the area between two transfer zones is usually a region where only medium and low data transfer rates are available from the network to the mobile terminals. The corresponding zones in which no transmission between access points and users is possible are called 'no-transmission zones'. Discontinuous coverage networks might provide some additional data transfer in so-called 'intermediate zones' located between individual transfer zones by way of especially established transmissions if required to guarantee a particular quality of service (QoS), i.e. avoid service breaks and provide fast service start. An intermediate zone is usually split into two areas, a medium data rate area and a low data rate area. Hereinafter, said no-transmission zones and said intermediate zones will be referred to as 'no-transfer zones' in order to distinguish them from the above defined high data rate transfer zones.

A discontinuous coverage network is generally made up of a number of radio access points (RAPs), a respective transfer zone around each radio access point, and a no-transfer zone separating a given radio access point, i.e. the corresponding transfer zone from other radio access points in the network. Thus, the individual transfer zones of the discontinuous network can be referred to as 'disconnected transfer zones'.

In order to avoid a service break in the no-transfer zone between two transfer zones of the network, in the two kinds of networks described above data is transferred to the mobile station and stored in a respective cache memory of the mobile stations during the crossing of transfer zones. The cached data is then used in the no-transmission or intermediate zones to make an application running on the mobile stations operate seamlessly. Thus, service breaks in the no-transfer zones between transfer zones are mainly avoided owing to cache memories and corresponding caching mechanisms located, e.g., in the above mentioned network component. The network component can be an access controller or a gateway on the network side.

The patent application EP 1 549 096 describes a telecommunication method for a telecommunication network which provides discontinuous coverage. The telecommunication network has a plurality of disconnected cells. A method is disclosed which comprises providing a data stream to a mobile station within the coverage of a first one of the plurality of cells. The data stream is interrupted when the mobile terminal is moved outside the coverage. Further a second one of the plurality of cells to be the target cell of the mobile terminal is predicted and the data stream is provided to a server assigned to the second cell. The data stream is resumed to the mobile terminal when the mobile terminal is within the coverage of the second cell.

The patent application EP 1 624 712 describes a method for improving mobility in discontinuous coverage networks, an access controller and a corresponding radio access point. The method disclosed in EP 1 624 712 provides services from a content server to a terminal belonging to a discontinuous coverage network, wherein the terminal moves from a first radio coverage zone to a second radio coverage zone over a zone of non radio coverage. The discontinuous network architecture comprises access controllers and radio access points, wherein each pair of radio access controllers and radio access points defines a radio coverage zone. The method comprises the step of sending in advance from a first access controller data in a cache memory of at least one radio access point of the second radio coverage zone, when the terminal is outside of the second radio coverage zone.

In order to provide a very low probability of service breaks with this discontinuously service delivery method, i.e. guarantee a given QoS, the caches of mobile terminals leaving a given transfer zone should be filled with data to maximum extent as data is only transferred to the mobile station within the transfer zones. Therefore, in known discontinuous coverage networks robust methods of data packet scheduling (also referred to as lines of cache (LoC)) and suitable medium access control (MAC) protocols typically allow all mobile stations to receive the required lines of cache for a given application before leaving a transfer zone.

A crucial issue for networks serving mobile users is however the handover mechanism. In a traditional way, the connection to the radio access point of the initial transfer zone was broken and a new connection to the radio access point of the new transfer zone was established. This is known as a 'break before make' handover or 'hard' handover. This technique is employed in first and second generation communication networks. A break before make handover leads to a temporary disconnection of the mobile station to the network which leads to a decrease in the network capacity. The hard handover techniques are optimized in order to minimize the connection interruptions duration and in order to avoid any data loss and in order to reduce the capacity loss of the network.

In third and fourth generation mobile communication networks an alternative solution is nowadays preferred. There, so-called 'make before break' or 'soft' handovers are carried out in order to transfer a connection that has been initially established between a mobile station and a network via a radio access point to another radio access point. A connection to the new radio access point is created before leaving the current radio access point and then, the old connection is broken. However, the establishment of two parallel transmissions during the soft handover requires higher radio resource usage in order to ensure the same service on both connection lines. Thus soft handovers must be achieved fast to avoid the network capacity diminution.

Soft handover techniques have been developed for networks which have cells that operate on the same frequency noted inter-frequency networks although hard handover techniques have been designed for networks with cells operating on different frequencies noted for inter-frequency networks. Compared with hard handovers, soft handovers require less power which reduces interference. Furthermore, soft handovers provide a continuous service as the connection is never interrupted. Thus soft handovers yield better performances in terms of capacity than hard handover techniques.

But even if the hard handover or soft handover duration is well optimized, the handover mechanism can be damaging to pico cell networks with small cell sizes and/or with short distances between neighboring transfer zones, because mobile stations might be handed over from one cell to a neighboring cell frequently. Thus, the handover mechanism is more often triggered than in networks in which the cell sizes are larger and/or in which the transfer zones lie further apart. A large amount of handovers that have to be handled by the network can lead to a dramatic decrease in the network's capacity because of the numerous triggering of two parallel transmissions or connections interactions for each user changing from a high data rate transfer zone of one cell to another high data rate transfer zone of another cell.

There is therefore a need for an improved method of triggering a handover of a mobile station in a network providing discontinuous coverage. There is furthermore a need for an improved discontinuous coverage network that provides means for performing the method in accordance with the invention and the need for an improved network component for triggering the handover of the mobile station.

SUMMARY OF THE INVENTION

According to a first aspect of the present invention, the object is achieved by providing a method of triggering a handover of a mobile station in a discontinuous coverage radio network. The method comprises the step of transferring at a point in time a data volume via a first transfer zone of the discontinuous coverage radio network to a cache storage of the mobile station, wherein the data volume permits the provision of a service to the mobile station for at least the duration of a period of time, wherein the first transfer zone being the serving transfer zone of the mobile station. The method further comprises the step of triggering the handover of the mobile station from the first transfer zone to a second transfer zone of the discontinuous coverage radio network only after the period of time has been spent with respect to the point in time, wherein the mobile station has been moved in the mean time from the first transfer zone to the second transfer zone. The method in accordance with the invention is particularly advantageous as the handover is only carried out when at least the period of time has been spent after the point of time. This reduces the total amount of handovers carried out in discontinuous coverage networks, maybe even dramatically. As fewer handovers have to be handled and carried out by the network, the total network capacity is increased.

Furthermore, the so-called ping pong phenomenon which occurs when mobile stations are handed over repeatedly from the first transfer zone to the second transfer zone and vice versa is eliminated.

Picocell networks which provide discontinuous radio coverage are cellular networks wherein each cell covers a relative small area and wherein each cell comprises a transfer zone which is separated from another transfer zone of an adjacent cell by a no-transfer zone. The no-transfer zone can be such that no data at all can be provided to a mobile station or such that data at a reduced transfer rate can be transmitted to the mobile station passing through this zone. The method in accordance with the invention is applicable for triggering a handover of a mobile station served by such a picocell network. As cell sizes are relative small, mobile stations might change cells rapidly. The method in accordance with the invention is particularly advantageous for usage in picocell networks as handovers are triggered only when the period of time has been spent with respect to the point of time and not when a mobile station arrives at another cell. Hence, the total amount of handovers of mobile stations from a serving cell to a target cell is reduced, maybe even drastically. As fewer handovers have to be handled and carried out by the network, the total network capacity is increased.

The method in accordance with the invention is also applicable in so called info-station networks, wherein the transfer zones are spatially separated from each other by a no-transfer zone in which no data transmission can be provided to mobile stations. The reason is that the period of time can be adapted so that the data volume is sufficient to provide the service to a user of the mobile station while passing through the no-transfer zone. The period of time can furthermore be adapted so that the mobile station is able to pass two or more no-transfer zones without the need of further provision of data. Hence, handovers do not have to be performed whenever a mobile station enters a transfer-zone of an info-station network but when the period of time has been spent with respect to the above mentioned point in time. Thus, as a result, the total amount of handovers performed by a (info-station) network is reduced. This leads to an increase in the network performance.

In accordance with an embodiment of the invention, the method further comprises determining the period of time. The period of time can be determined or specified for each mobile station served by the network independently or the period of time can be determined for a plurality of mobile stations served by the network.

In accordance with an embodiment of the invention, the period of time corresponds at least to the time that is required for the user to travel from the first transfer zone to the second transfer zone, wherein the user passes at least a third transfer zone of the discontinuous coverage radio network when travelling from the first to the second transfer zone. This provides the advantage that the user is able to pass through at least one transfer zone without the need of a handover. Network resources are therefore saved as the mobile station is able to serve the user autonomously.

In accordance with an embodiment of the invention, the method further comprises the step of storing the point in time. The point in time is stored in order to be able to determine later on, if the period of time has been spent with respect to the point in time.

In accordance with an embodiment of the invention, the period of time is determined by use of a mobility model. The mobility model can be applied separately for each mobile station connected to the network. A user of the mobile station might pass through transfer zones of a discontinuous coverage radio network regularly by using a recurrent path. For example, the user might pass each morning and correspondingly each afternoon through a few transfer zones when she or he is on the way from home to his working place or vice versa. The amount of time she/he usually spends in each transfer zone can be tracked. The period of time can then be related to the amount of time the user spends in two, three or even more transfer zones. A further mobility model is described in the patent application EP 1 549 096 which is herewith incorporated by reference.

In accordance with an embodiment of the invention, a handover of the mobile station to the second transfer zone is also initiated, if the cache filling level of the cache drops below a threshold value, wherein the threshold value is specified.

If the cache of the mobile terminal is filled so that the cache filing level exceeds the threshold value, then sufficient data is held by the cache to provide a service to the user while the mobile terminal is passing through a no-transfer zone. The threshold value can be specified accordingly. Thus, a handover of the mobile station is triggered independent of the time that has been passed with respect to the point in time if not enough data is stored on the cache. The probability that the mobile station runs out of data while passing through a no-transfer zone is therefore minimized. The mobile station is thus able to provide the service to its user autonomously while passing through at least one no-transfer zone.

In accordance with an embodiment of the invention, the period of time is given. The period of time can for example be specified by an administrator of the network.

In accordance with an embodiment of the invention, the data volume is transferred to the mobile station when it is on the way of leaving the first transfer zone.

In a second aspect, there is provided a computer program product for triggering a handover of a mobile station in a discontinuous coverage radio network, wherein the computer program product comprises computer executable instructions, wherein the instructions are adapted to performing the step of transferring at a point in time a data volume via a first transfer zone of the discontinuous coverage radio network to a cache storage of the mobile station, wherein the data volume permits the provision of a service to the mobile station for at least the duration of a period of time, wherein the first transfer zone is the serving transfer zone of the mobile station. The instructions are further adapted to performing the step of triggering the handover of the mobile station from the first transfer zone to a second transfer zone of the discontinuous coverage radio network only after the period of time has been spent with respect to the point in time, wherein the mobile station has been moved in the mean time from the first transfer zone to the second transfer zone.

In a third aspect, there is provided a discontinuous coverage radio network with means for transferring at a point in time a data volume via a first transfer zone of the discontinuous coverage radio network to a cache storage of the mobile station, wherein the data volume permits the provision of a service to the mobile station for at least the duration of a period of time, wherein the first transfer zone is the serving transfer zone of the mobile station. The discontinuous coverage radio network further comprises means for triggering the handover of the mobile station from the first transfer zone to a second transfer zone of the discontinuous coverage radio network only after the period of time has been spent with respect to the point in time, wherein the mobile station has been moved in the mean time from the first transfer zone to the second transfer zone.

In a fourth aspect, there is provided a network component of a discontinuous coverage network with means for transferring at a point in time a data volume via a first transfer zone of the discontinuous coverage radio network to a cache storage of the mobile station, wherein the data volume permits the provision of a service to the mobile station for at least the duration of a period of time, wherein the first transfer zone is the serving transfer zone of the mobile station. The network component further comprises means for triggering the handover of the mobile station from the first transfer zone to a second transfer zone of the discontinuous coverage radio network only after the period of time has been spent with respect to the point in time, wherein the mobile station has been moved in the mean time from the first transfer zone to the second transfer zone.

In accordance with an embodiment of the invention, the network component is associated with the first and the second transfer zone. The network component is therefore able to provide the data to the first transfer zone, and to monitor the amount of time passed while the mobile station is transferred from the first to the second transfer zone so that it is ensured that the handover is not triggered before the period of time has been spent with respect to the above mentioned point in time.

In accordance with an embodiment of the invention, the network component corresponds to an access controller associated with a radio access point or to a gateway associated with a radio access point or with a plurality of radio access points of the discontinuous coverage radio network.

BRIEF DESCRIPTION OF THE DRAWINGS

Further advantages and characteristics in accordance with the present invention can be gathered from the following description of preferred embodiments given by way of example only with reference to the enclosed drawings, whereof.

DETAILED DESCRIPTION OF PREFERRED EMBODIMENTS

Figure 1:
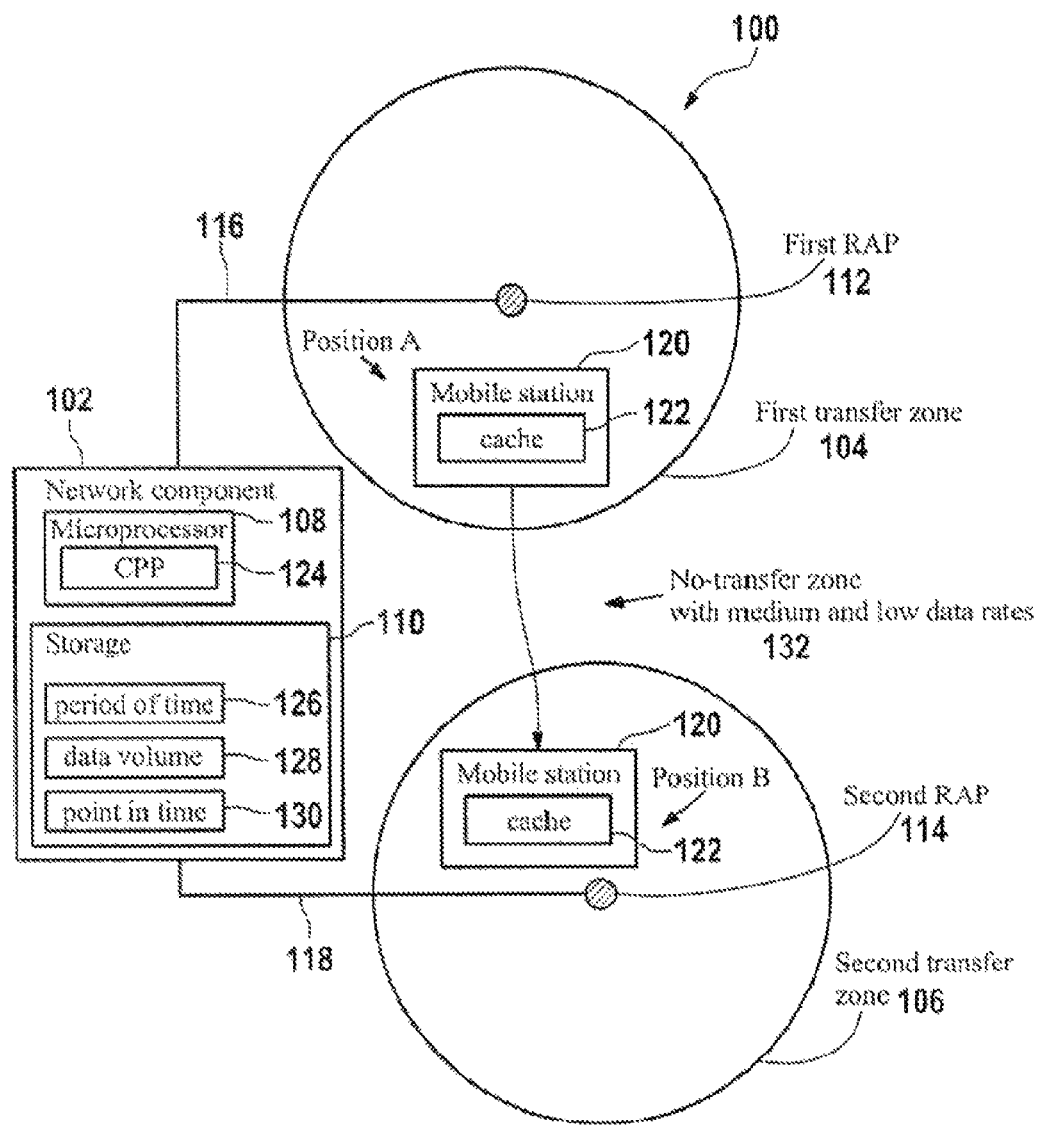
FIG. 1 shows a block diagram of a discontinuous coverage network.

FIG. 1 shows a block diagram of a discontinuous coverage network 100. The discontinuous coverage network 100 comprises a network component 102, a first transfer zone 104, and a second transfer zone 106. The network component 102 comprises a microprocessor 108 and a storage device 110. The first transfer zone 104 further comprises a first radio access point (RAP) 112 and the second transfer zone 106 comprises a second radio access point 114.

The network component 102 is associated with both, the first and the second transfer zones 112 and 114. The network component 102 is therefore able to communicate with and to transfer data to the radio access points 112 and 114 via connections 116 or 118, respectively. The connections 116 and 118 are high speed connections, such as high speed fiber connections, that enable a quick data transfer from the network component 102 to the first and to the second radio access point 112 and 114.

The discontinuous coverage network 100 further comprises a no-transfer zone 132 that lies in the area between the first transfer zone 104 and the second transfer zone 106. The first and second transfer zones 104 and 106 are therefore disconnected from each other with the no-transfer zone 132 in between. In the no-transfer zone 132, only medium and low data rates can be transferred to mobile stations, whereas in the first and in the second transfer zone 104 and 106, high data rates are available for the transfer of data to a mobile station.

Data is usually transferred to mobile stations only within the transfer zones and data is only provided exceptionally to the mobile station when it is located in the no-transfer zone.

The microprocessor 108 executes a computer program 124. The computer program 124 is for example permanently stored on the storage 110 and loaded into the microprocessor 108 at the startup of the network component 102.

The discontinuous coverage network 100 further comprises a mobile station 120. The mobile station 120 further comprises a cache storage 122. The mobile station 120 is initially located at position A in the first transfer zone 104. The mobile station 120 is served by the first transfer zone 104. Thus the mobile station 120 has established an active connection with the network 100 via the first radio access point 112. During the connection, the mobile station is provided with a service such as for example a video service. The computer program product 124 determines the data volume 128 which permits the provision of the service to the mobile station 120 for at least the duration of a period of time 126. The data volume 128 is at a point in time 130 transferred via the connection 116 and the first radio access point 112 to the cache storage 122 of the mobile station 120. The point in time 130 is stored on the storage device 110.

The mobile station 120 is after reception of the data volume 128 for the duration of the period of time 126 autonomous with respect to the service. Thus the mobile station 120 is therefore for the duration of the period of time 126 able to provide the service to its user without the need of the provision of data from the network 100. Thus no transfer of data takes place until the period of time 126 has been passed with respect to the point in time 130 when the data volume 128 has been transferred to the mobile station 120.

After the data volume 128 has been transferred to the mobile station 120, the mobile station 120 might be moved from position A through the no-transfer zone 132 to position B in the second transfer zone 106. The mobile station 120 might request the network 106 for a handover when the mobile station 120 detects that it has been brought to the second transfer zone 106. However a handover is only triggered if the computer program product 124 determines that the period of time 126 has been spent with respect to the point in time 130. Only if this is the case, the network component 102 initiates a handover of the mobile station 120 to the second transfer zone 106.

The data volume 128 is sent to the mobile station 120 before it left the transfer zone. This can for example be detected by evaluating the measurement report that is sent by the mobile station 120 to the first radio access point 112 periodically and wherein the mobile station 120 reports the signal strengths of the signals that are received from the first radio access point 112. A fading signal strength is thus a clear indication that the mobile station 120 is on the way of leaving the first transfer zone 104.

The period of time 126 can be a value that is set by a supervisor of the network 100. The value can then be chosen to be larger than the average amount of time that is spent by the mobile stations in the no-transfer zone 132. This value can for example be obtained by determining the transfer times through the no-transfer zone 132 for a large plurality of mobile stations and by then taking the average of the transfer times. Alternatively, the period of time 126 can be derived from a mobility model applied to each mobile station served by the network 100.

Figure 2:
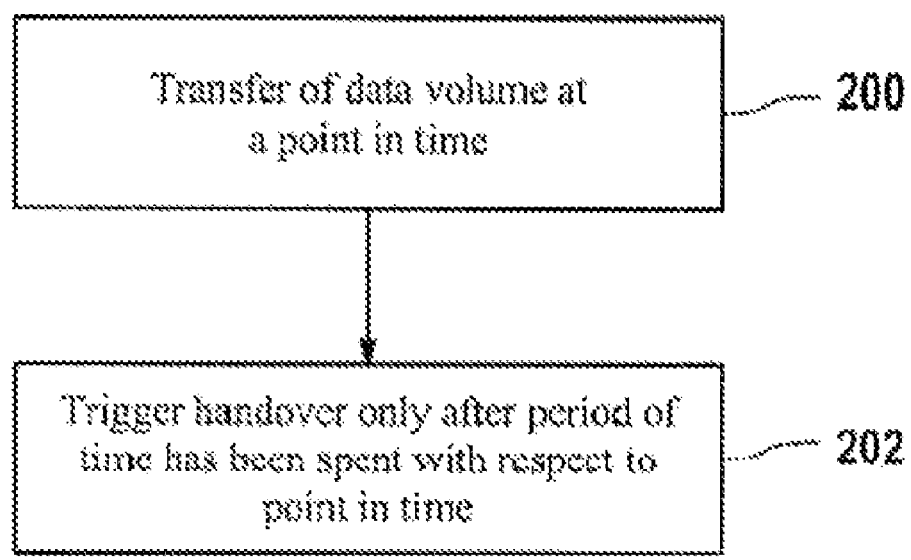
FIG. 2 shows a flow diagram illustrating the basic steps performed by the method in accordance with the invention.

FIG. 2 shows a flow diagram illustrating the basic steps performed by the method in accordance with the invention. In step 200, a data volume is transferred at a first point in time via a first transfer zone of a discontinuous coverage network to a cache storage of a mobile station. The first transfer zone is the serving transfer zone of the mobile station and the data volume is sufficient to allow for the provision of a service to the mobile station for at least the duration of a period of time. In step 202, a handover of the mobile station from the first transfer zone to the second transfer zone is triggered only after the first period of time has been spent with respect to the first point in time, wherein the mobile station has been moved in the mean time from the first transfer zone to the second transfer zone.

Figure 3:
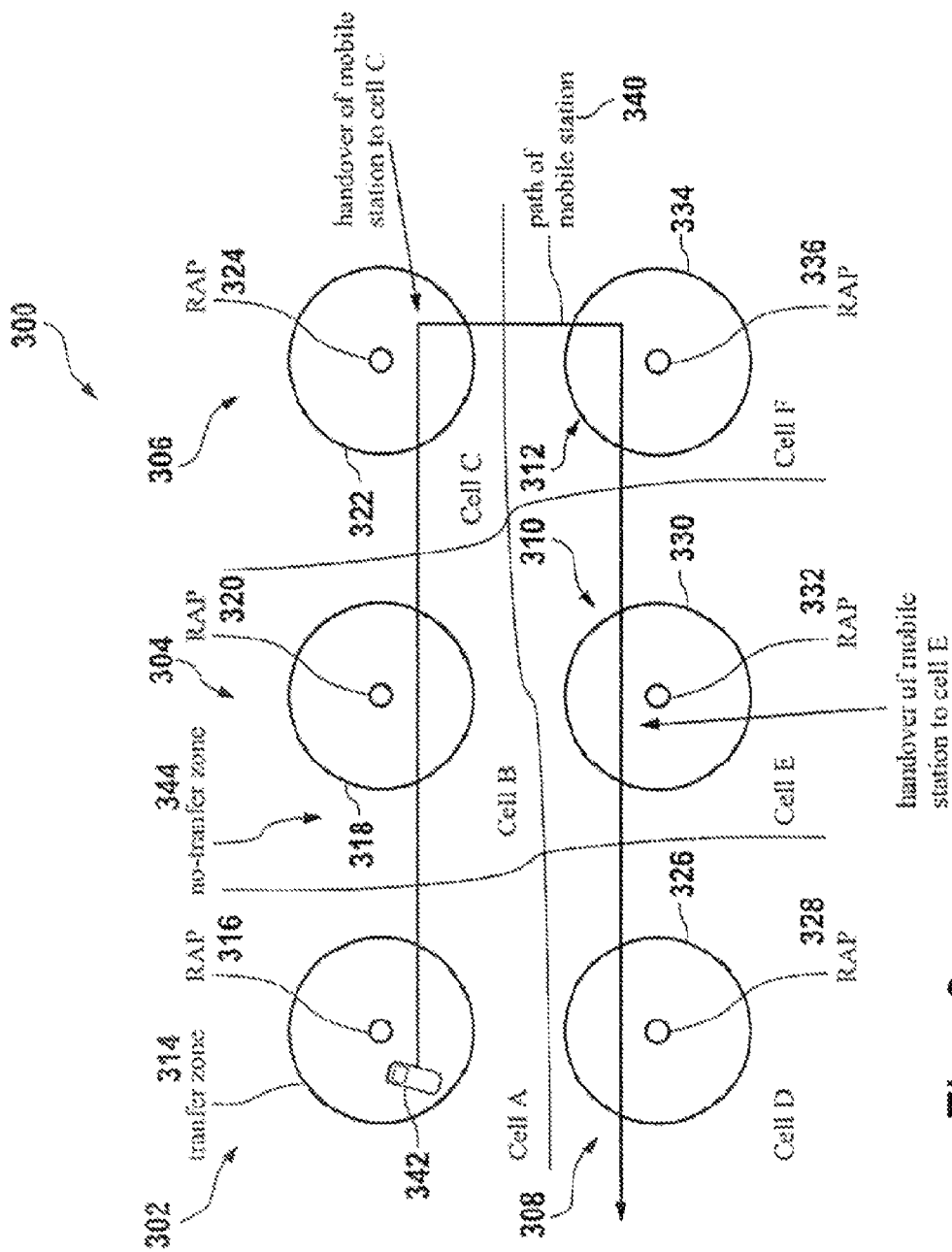
FIG. 3 shows another block diagram of a discontinuous coverage network.

FIG. 3 shows another block diagram of a discontinuous coverage network 300. The network 300 comprises cell A 302, cell B 304, cell C 306, cell D 308, cell E 310 and cell F 312. Each cell comprises a transfer zone that comprises a radio access point. Cell A 302 comprises transfer zone 314 and the radio access point 316. Cell B 304 comprises the transfer zone 318 and the radio access point 320. Cell C 306 comprises the transfer zone 322 and the radio access point 324. Cell D 308 comprises the transfer zone 326 and the radio access point 328. Cell E 310 comprises the transfer zone 330 and the radio access point 332. Cell F 312 comprises the transfer zone 334 and the radio access point 336. Each cell furthermore comprises a no-transfer zone as shown for the cell B 304, which comprises the no-transfer zone 344.

The bold line illustrates a path 340 of a mobile station 342 through the network 300. The path 340 starts at cell A 302 and passes through the cells as shown in FIG. 3.

The mobile station 342 connects to the network 300 in the transfer zone 314 via the radio access point 316 for the first time. A data volume is determined that permits the provision of a service requested by the mobile station 342 for at least the duration of a period of time. The period of time is given according to statistics which have been collected by the network 300 about the mobile station 342 and which corresponds in the example described here to two times the amount of time the mobile station spends in the no-transfer zone between two transfer zones. The statistics could for example be generated by tracking all paths of the mobile station 342 in the network 300. From the tracked paths, the average amount of time the mobile station 342 spends between two transfer zones can then be determined. The period of time corresponds then to the average amount of time.

The data volume is determined and transferred at a point in time to the mobile station, before the mobile station 342 leaves the transfer zone 314.

The mobile station 342 moves then along path 340 through cell B. As the mobile station has been provided in cell A with the data volume that corresponds to two times the amount of time the mobile station spends on average in the no-transfer zone, the cache of the mobile station holds still sufficient data to provide the corresponding service. A handover of the mobile station 342 to the transfer zone 318 is therefore not initiated even if requested by the mobile station 342 if the time spent with respect to the point in time is not larger than the period of time. For the case, when the mobile station 342 has spent a large amount of time in the no-transfer zone, a handover of the mobile station 342 to the transfer zone 318 might be triggered if the time spend with respect to the point in time is larger than the period of time. After the handover, another data volume is provided to the mobile station so that the service can be further provided.

But for the following, it is assumed that no handover of the mobile station 342 is performed from cell A 302 to cell B 304. Then the mobile station passes on to the cell C and arrives in the transfer zone 322. As the data volume has been provided in the transfer zone 314 to the mobile station 342 which is sufficient to provide the service for the period of time that corresponds to the amount of time the mobile station spends within the transfer zone, the period of time might probably have been spent with respect to the point in time while the mobile station 342 is in the transfer zone 322. Thus a handover is performed from the cell A 302 to the cell C 306. In cell C 306 a further data volume is therefore provided to the mobile station which is sufficient for the mobile station 342 to pass at least another cell. As can be seen, the mobile station was able to pass cell B 304 without the need of a handover to the cell B as sufficient data has been provided before to the cache of the mobile station. Thus the average amount of handovers that are performed by the network 300 is reduced. This leads to an increase of the available network capacities as less resources are wasted for handovers.

The mobile station 342 can further move along the path 340 to cell F 312. As the cache of the mobile station 342 has been recharged before, a handover from cell C 306 to cell F 312 is probably not required as not sufficient time might have been spent with respect to the point in time when the last data volume has been transferred to the mobile station 342. The next handover of the mobile station 342 will probably be performed when the mobile station 342 arrives in cell E 310 as the period of time might have been spent with respect to the point in time when the transfer of the data volume in the zone 306 took place before the mobile station 342 arrives in the cell E 310. There the mobile station's cache is reloaded so that the mobile station 342 can pass through cell D 308 without the need of a handover.

| List of Reference Numerals | |
|---|---|
| 100 | Discontinuous coverage network |
| 102 | Network component |
| 104 | First transfer zone |
| 106 | Second transfer zone |
| 108 | Microprocessor |
| 110 | Storage device |
| 112 | First radio access point |
| 114 | Second radio access point |
| 116 | Connection |
| 118 | Connection |
| 120 | Mobile station |
| 122 | Cache storage |
| 124 | Computer program product |
| 126 | Period of time |
| 128 | Data volume |
| 130 | Point in time |
| 132 | No-transfer zone |
| 300 | Discontinuous coverage network |
| 302 | Cell A |
| 304 | Cell B |
| 306 | Cell C |
| 308 | Cell D |
| 310 | Cell E |
| 312 | Cell F |
| 314 | Transfer zone |
| 316 | Radio access point |
| 318 | Transfer zone |
| 320 | Radio access point |
| 322 | Transfer zone |
| 324 | Radio access point |
| 326 | Transfer zone |
| 328 | Radio access point |
| 330 | Transfer zone |
| 332 | Radio access point |
| 334 | Transfer zone |
| 336 | Radio access point |
| 340 | Path of mobile station |
| 342 | Mobile station |
| 344 | No-transfer zone |

The invention claimed is:

1. A method of triggering a handover of a mobile station in a discontinuous coverage radio network, said method comprising:
   transferring at a point in time a data volume via a first transfer zone of the discontinuous coverage radio network to a cache storage of said mobile station, wherein the data volume permits the provision of a service to the mobile station for at least the duration of a period of time, wherein said first transfer zone is the serving transfer zone of the mobile station;
   triggering said handover of said mobile station from said first transfer zone to a second transfer zone of the discontinuous coverage radio network only after said period of time has been spent with respect to the point in time, wherein said mobile station has been moved in the meantime from said first transfer zone to said second transfer zone; and
   performing the handover of the mobile station to the second transfer zone if a filling level of the cache of the mobile station drops below a threshold value, wherein the threshold value is specified.

2. The method of claim 1, said method further comprising:
   determining said period of time;
   storing said point in time.

3. The method of claim 1, wherein said period of time corresponds at least to the time that is required for the mobile station to travel from the first transfer zone to the second transfer zone, wherein the mobile station passes at least a third transfer zone of said discontinuous coverage radio network when travelling from the first to the second transfer zone.

4. The method of claim 2, wherein said period of time is determined by use of a mobility model.

5. The method of claim 1, wherein said period of time is given.

6. A computer program product for triggering a handover of a mobile station in a discontinuous coverage radio network, said computer program product comprising computer executable instructions stored on a non-transitory computer-readable medium, said instructions being configured to perform the steps:
   transferring at a point in time a data volume via a first transfer zone of the discontinuous coverage radio network to a cache storage of said mobile station, wherein the data volume permits the provision of a service to the mobile station for at least the duration of a period of time, wherein said first transfer zone is the serving transfer zone of the mobile station;
   triggering said handover of said mobile station from said first transfer zone to a second transfer zone of the discontinuous coverage radio network only after said period of time has been spent with respect to the point in time, wherein said mobile station has been moved in the mean time from said first transfer zone to said second transfer zone; and
   performing the handover of the mobile station to the second transfer zone if a filling level of the cache of the mobile station drops below a threshold value, wherein the threshold value is specified.

7. A discontinuous coverage network comprising:
   means for transferring at a point in time a data volume via a first transfer zone of the discontinuous coverage radio network to a cache storage of a mobile station, wherein the data volume permits the provision of a service to the mobile station for at least the duration of a period of time, wherein said first transfer zone is the serving transfer zone of the mobile station;

means for triggering said handover of said mobile station from said first transfer zone to a second transfer zone of the discontinuous coverage radio network only after said period of time has been spent with respect to the point in time, wherein said mobile station has been moved in the mean-time from said first transfer zone to said second transfer zone, and means for performing the handover of the mobile station to the second transfer zone if a filling level of the cache of the mobile station drops below a threshold value, wherein the threshold value is specified.

8. A network component of a discontinuous coverage network comprising:

means for transferring at a point in time a data volume via a first transfer zone of the discontinuous coverage radio network to a cache storage of a mobile station, wherein the data volume permits the provision of a service to the mobile station for at least the duration of a period of time, wherein said first transfer zone is the serving transfer zone of the mobile station;

means for triggering said handover of said mobile station from said first transfer zone to a second transfer zone of the discontinuous coverage radio network only after said period of time has been spent with respect to the point in time, wherein said mobile station has been moved in the mean time from said first transfer zone to said second transfer zone, and means for performing the handover of the mobile station to the second transfer zone if a filling level of the cache of the mobile station drops below a threshold value, wherein the threshold value is specified.

9. The network component of claim 8, wherein said network component is associated with said first and said second transfer zone.

\* \* \* \* \*